United States Patent [19]

Bachrach et al.

[11] 4,287,749
[45] Sep. 8, 1981

[54] TAPERED EXTRUSION DIE AND METHOD OF FORMING THE SAME

[75] Inventors: Benjamin I. Bachrach, Dearborn; William J. Fuhrman, Bloomfield Hills, both of Mich.

[73] Assignee: Ford Motor Company, Dearborn, Mich.

[21] Appl. No.: 94,629

[22] Filed: Nov. 15, 1979

[51] Int. Cl.³ .............................................. B21C 25/08
[52] U.S. Cl. ...................................... 72/467; 72/370; 76/107 R; 83/19; 83/176; 408/19
[58] Field of Search ............. 76/107 R, 107 A, 101 R, 76/107 S; 51/324, 317; 219/69 M; 72/367, 467, 370; 408/19; 83/17, 19, 176; 29/DIG. 42, 525, 557

[56] References Cited

U.S. PATENT DOCUMENTS

| | | | |
|---|---|---|---|
| 1,617,511 | 2/1927 | Balch | 83/19 |
| 2,375,518 | 5/1945 | Bolle | 83/19 |
| 3,768,344 | 10/1973 | Feldcamp | 76/107 R |
| 3,828,628 | 8/1974 | Roger | 76/107 R |
| 4,086,832 | 5/1978 | Korytko | 83/17 |
| 4,128,928 | 12/1978 | Shotts | 408/19 |
| 4,181,051 | 1/1980 | Drori | 83/19 |

*Primary Examiner*—Roscoe V. Parker
*Attorney, Agent, or Firm*—Frank G. McKenzie; Donald J. Harrington

[57] ABSTRACT

A sleeve having a tapered outer surface is shrink or interference fitted over the outer surface of a die blank in which is formed a central bore, a larger diameter bore and a transition bore therebetween. The diametrical interference between the sleeve and the die blank is effective in producing an elastic deformation of the smaller diameter bore causing it to assume a conical shape. The die blank and sleeve are restrained within a casing and the inner surface of the die is formed by electrical discharge machining, electrical chemical machining or by other known methods. The die casing and sleeve are removed from the die, allowing the release of the stored strain energy of deformation which causes the smaller bore of the die to assume a conical shape tapering radially outwardly from its inner extremity. The sharp corner that results at the innermost end of the smaller bore is removed by lapping a straight-sided tool through the central opening of the die.

14 Claims, 6 Drawing Figures

TAPERED EXTRUSION DIE AND METHOD OF FORMING THE SAME

BACKGROUND OF THE INVENTION

1. Field of the Invention

This invention relates to a method for fabricating an extrusion die and in particular a helical gear extrusion die in which the surface of the die beyond the surface that first forms the contour of the extrusion tapers radially outwardly from the throat or land of the forming surface by reason of the die surface having been formed in a prestressed, elastically deformed condition, which is later removed and the die permitted to assume an equilibrium shape.

2. Description of the Prior Art

In the process of forming articles by extruding metal through a die having the contour of the part to be formed, it is known in the art that the extrusion expands radially outwardly after being forced through the forming surface of the die. The radial expansion is a result of elastic deformations produced in the extrusion blank during the forming process when the blank is forced through the forming throat. The strain energy stored in the part is released after the extrusion blank passes the forming surface of the die.

Unless the die provides a suitably larger space beyond the forming throat or land than the space at the forming surface, the extrusion will expand into abutting engagement with the die surface and produce an excessively high frictional force. This force may in fact exceed the capacity of the metal forming press to force the extrusion blank through the die and could promote galling of the die surface and lead to premature failure. In any case, an excessive amount of energy is required to produce the extrusion due to the large frictional forces that would result.

The prior art has recognized the difficulties associated with this expansion of the extrusion within the die. Extrusion dies typically are formed so as to produce a greater annular space beyond the forming surface than the space defined by the forming surface. Electrical discharge machining EDM methods, wherein one carbon electrode having the desired shape of the part to be formed is passed through the die to establish the die land, are frequently employed. An electrical current produces a spark between the electrode and the inner surface of the die blank, which operates to remove metal from the die surface in the shape of the carbon electrode. In this way the forming surface of the die is established. However, in order to furnish the relief beyond the forming land, the prior art has typically used a second, in this case, tapered electrode to form a cavity beyond the die land which is tapered outwardly to provide the requisite increased volume to accommodate the radial expansion.

However, because two distinct electrodes are used in conventional forming processes, it is extremely difficult to adapt the electrodes to eliminate geometric discontinuities particularly at the cross section where the tapered surface and the land forming surface intersect.

When the extruded part has a noncircular cross section, particularly when it is lobed, as, for example, a gear, an additional difficulty is presented when the inner surface of the die is formed by a process that requires an electrode or forming tool to be inserted into the die for shaping purposes, but then to be withdrawn and the rest of the die surface formed either by another tool or by the same tool introduced into the die from the opposite direction. When this procedure occurs, in addition to the difficulties associated with aligning the centerlines of the respective tools so that the axes are colinear, the tools must be additionally controlled so that at the cross section where the first shaping operation terminates and the second begins, the tools correspond circumferentially. This circumferential registry is required because of the nonuniform shape of the outer contour of the parts. For example, where the die is to be used for extruding gear teeth, the flanks of the teeth on the die must form a continuous and smooth surface along the full length of the die, even though the surface is shaped by two distinct passes of a tool through the die blank. When the gear teeth are helical, the difficulty of maintaining circumferential registry is compounded by the requirement that the forming tools rotate while they pass axially through the die blank.

Other and more conventional methods are known in the art for forming the interior surface of an extrusion die. For example, grinding and, before the die blank is hardened, milling and broaching techniques are available. Each of these, however, presents the same difficulties of circumferential misalignment and dimensional discontinuity as discussed previously with respect to electrical discharge machining. Grinding, however, increases the cost to produce the die.

SUMMARY OF THE INVENTION

It is, therefore, an object of this invention to teach a method of making an extrusion die that avoids the possibility of polar, axial or radial discontinuities along the length of the shaping surface of the die. This object is realized according to the die shaping process of this invention because a single tool forms the entire forming surface of the die during a single pass of the tool through the die. In this way radial, axial and circumferential misalignment discontinuities are absent from the extrusion die and from the resulting extrusion.

It is a related object of this invention to teach a method for forming an extrusion die and to produce such a die having an axially directed land extending over a short length of the die and providing an annular tapering recess along the remaining forming surface of the die that can accommodate elastic expansion of the extruded part after it passes the land surface. The tapered recess surface portions of the die have the outer contours of the extruded part formed thereon, but, because the surface is conical and tapers linearly to provide a larger space than that of the forming land, the contour of the extruded part can expand radially into the tapered recess portion of the die. This objective is accomplished because the inner surface of the die is shaped while the die is prestressed by shrinking a sleeve over its outer surface. When the prestressed condition is removed, the die expands outwardly to an equilibrium condition producing an outwardly extending conical surface upon which the shape of the extrusion has been impressed.

It is another object of this invention to teach the method wherein an extrusion die having an annular recess beyond the land is used to form an extrusion whose outer contour varies along its length, as, for example, a helix, because the motion of the tool that forms the surface of the die is controlled both as to its axial motion while passing through the die and with respect to its polar motion while passing through the die. Because the axial and polar movement of the tool can be related, a helix as well as a part having a non-varying cross-section can be extruded with a die made by the method of this invention.

It is still another object of this invention to produce an extrusion die having a nontapered land within the die intermediate its axial ends. The length of the land is controlled by the extent to which a straight-sided tool is permitted to remove material from the inner surface of the die in the region of a reentrant corner that is produced by the die forming process of this invention. This objective is realized because the die is initially formed with aligned cylindrical bores extending partially along the length of the die in an initial step of this process. As a result of forming the interior shaping surfaces of the die while the die is in a precompression state of stress and the subsequent removal of the prestressed condition after the surface is formed, a reentrant corner is produced at the inner extremities of the original cylindrical bores. By lapping processes the sharp corner can be removed and its length determined.

It is yet another object of this invention to produce an extrusion die having an outwardly tapered surface formed with a tool that is not tapered.

DESCRIPTION OF THE PREFERRED EMBODIMENTS

Figure 1:
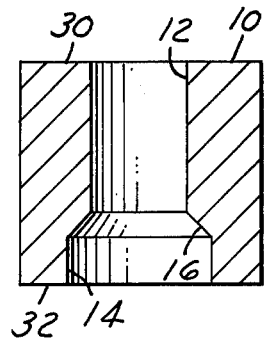
FIG. 1 is a cross section taken at an axial plane of a die blank formed with two central cylindrical bores of unequal diameters that are joined with a conical transition bore.

Turning now to a more specific description of this invention, attention is directed first to FIG. 1, which shows a die 10 having a first centrally located cylindrical bore 12 formed partially along its length, a second cylindrical bore 14 aligned with the first and extending partially along the length of the die and a conical bore 16 intermediate bores 12, 14 providing a transition between the innermost extremeties 12, 14. The outer surface of the die 10 provides a right circular cylindrical surface whose axis is aligned with the axes of the bores. The die 10 is made from a high alloy steel, preferably high speed steel that has exceptionally good wear resistance and toughness. After the die is formed with the bores, it is heat treated according to standard techniques used for making extrusion dies.

Figure 2:
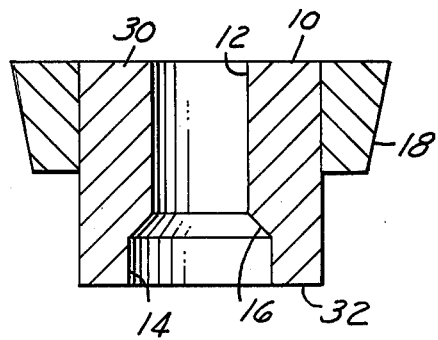
FIG. 2 is an axial cross section showing a tapered sleeve having been shrink or interference fitted over a portion of the outer surface of the die blank.
Figure 3:
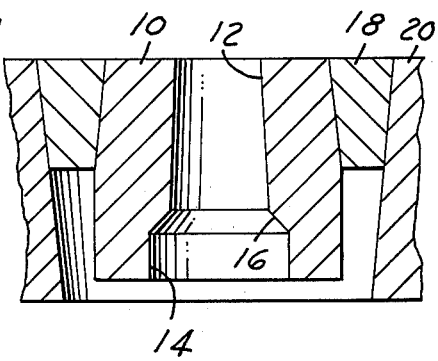
FIG. 3 is an axial cross section showing a die case having a central conical bore corresponding to the taper of the sleeve fitted over the outer surface of the sleeve and die thereby producing elastic deformation of the die bore.

FIG. 2 shows a sleeve 18 fitted on the outer surface of the die 10, but extending along the length of the die only a portion of its total length. The sleeve has a central cylindrical inner surface whose diameter is somewhat less than the outside diameter of the die 10, a diametrical interference of 0.0005 inches being produced therebetween. The sleeve has an outer conical surface that tapers from a larger outside diameter located substantially in the plane of the outer surface 30 of the die to a lesser outside diameter located at the axially opposite end of the sleeve. The sleeve is forced fitted into a case 20 thereby causing the elastic deformation of the die 10. FIG. 3 shows this elastic deformation of the die wherein the inner bore 12, instead of being cylindrical, is made conical. The outer surface of the die 10 is shown elastically displaced by reason of the force fit of the sleeve 18 and case 20 on its surface, a conical outer surface being produced. The sleeve extends axially approximately one-half the length of the die 10. The outer surface of the sleeve 18 is tapered to produce an angle with respect to the longitudinal axis of the die 10 that is in a range 1–7 degrees. Instead of force fitting the sleeve and case on the die, application of differential temperatures to the elements could be used to assembly the parts, the desired press fit resulting upon their returning to room temperature. The interference will produce a distortion of the bore 12 from its original cylindrical shape to the conical shape shown in FIG. 3.

The die casing 20 has an outer surface of sufficient size to provide the requisite stiffness and strength necessary to maintain the interference fit. Typically, the diameter of case 20 is six to ten times the diameter of bore 12.

The die, fitted with the sleeve 18, is inserted into the bore 22 of the die casing 20. The length of the casing 20 should be at least as great as the axial length of the sleeve 18 but need not extend as far as the length of the die 10. Casing 20 as well as the sleeve 18 are made of high yield strength steel, the casing having a sufficient size to react the hoop stresses developed in the die and in the sleeve during the interference-fitting process. Of course, the central bore 22 of the casing 20 can be formed with the diameter somewhat less than the outer diameter of the sleeve 18. In this case when the sleeve 18 and the die 10 onto which it is fitted are inserted into the bore 22, the diametrical interference is taken up when axial force is applied to the surface of the sleeve and the wedging action produced by the tapered surfaces causes elastic straining of the casing, the sleeve and the die 18. Alternatively, a diametrical interference between the casing, bore and sleeve can be removed either by heating the casing or chilling the sleeve-die assembly from ambient temperatures, sliding the outer surface of the sleeve into the bore 22 and allowing the various parts to return to a uniform ambient temperature.

The outer contour of the part ultimately to be formed by its being extruded through the die is next formed on the inner surface of the die. A preferred method for shaping the inner surface of the die to the outer contour of the part to be extruded is by electrical discharge machining. According to this known method, a carbon electrode, which may be axially tapered or straight-sided, is shaped so that it presents an outer contour having the form of the outer contour of the part to be extruded through the die. The electrode enters the die 10 by way of the smaller bore 12. After passing through the bore 12, the electrode enters the transition bore 16 and contacts the wall of the die 10 that defines the bore 14. Electric energy is discharged between the electrode and the die 10, which energy acts to remove material from the walls of the die 10, thereby impressing the shape of the electrodes upon the inner surface of the die over the length of the bores 12, 14, 16. The diameter of bore 12 is initially sized to be less than the minor diameter of the gear, and the diameter of bore 14 is less than the major diameter. In this way, the electrode will form its entire contour in the bore 12 and the outside diameter of the electrode will determine the size of bore 14.

Figure 4:
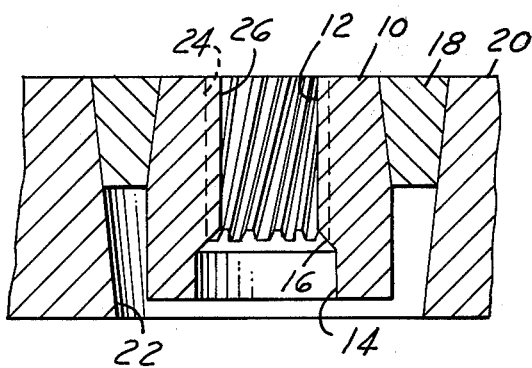
FIG. 4 is an axial cross section showing the inner surface of the die formed with the contour to which the extruded part, in this case, a helical gear, will largely conform, the contour having been formed by passing an electrode through the die using electrical discharge machining to form the die blank.

FIG. 4 shows the desired contour formed on the inner surface of the die, in this case a helical gear has been formed. In forming the surface by electrical discharge machining the electrode that was passed axially through the die was made to rotate at a predetermined rate consistent with the rate at which the electrodes pass axially. In this way a precise helix can be formed that is continuous over the length of the die.

During the electrical discharge machining process, the smaller bore 12 of FIG. 3 has been reshaped to the bore 24 of FIG. 4. The electrode has an outer surface that is cylindrical and a diameter equal to the major diameter of the gear teeth to be formed. Similarly, a second surface 26 is formed within the die 10 and represents the minor diameter of the helical gear teeth to be formed. The diameter of the surface 26 is also larger than the diameter of the bore 12.

Figure 5:
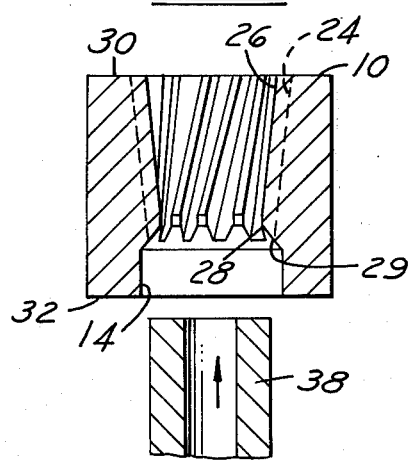
FIG. 5 is an axial cross section of the die after having the casing and sleeve removed showing the formed inner contour of the die having expanded radially outwardly.

FIG. 5 shows the die 10 in the form it assumes after having the casing 20 and the sleeve 18 removed. Upon such removal the surfaces 24 and 26 are seen to be displaced from their position as illustrated in FIG. 4. The surfaces 24 and 26 are the surfaces of the cones having the diameters of the root and the crest, respectively, of the gear to be formed by the die and having a taper angle, preferably in the range 2-3 degrees. The conical taper results because the elastic strain energy produced by shrinking or force fitting the sleeve 18 and the casing 20 on the die 10 is released following their removal. The tapering occurs due to the deformation field caused by the described interference fit. The elastic deformation of the die, therefore, produces a sharp corner 28 formed by the innermost extremity of the larger bore 14 and the transition bore 16.

Next, a tapered grinder having a surface generally corresponding to the surface 26, shown in FIG. 5, is passed into the die from the end 30. The grinder is generally of a somewhat larger diameter than the surface 26, and in this way the minor diameter of the gear teeth is further relieved. The die is then polished by abrasive flow machining techniques wherein silicon carbide particles, suspended in a putty, are forced axially back and forth through the die to remove the recast layer caused by electrical discharge machining. Blend radii are thereby formed between flanks of the teeth and surface of the transition bore 16.

In order to remove the sharp corner 28, which is best seen in FIG. 4, in the bore of the die 10 and to form in its place an axially directed throat or land, a nontapered lapping tool is oscillated axially on the gear tooth flanks within the bore in the presence of a slurry containing aluminum oxide or silicon carbide particles. The lapping tool and the abrasive particles operate to remove the crest 28; and by choosing laps with progressively larger tooth thicknesses, the crest can be reshaped to provide the land portion 34 as shown in FIG. 5 on the diametrically opposite side of the bore from the crest 28. During the lapping process the lapping tool is withdrawn from the die, rotated so that each tool of the lap engages each tooth of the die, and reintroduced into the die in the abrasive slurry environment. Finally, the inner surface of the die is polished.

In operation the die so formed will again be restrained with a casing similar to casing 20 but having a central opening adapted to receive the outer contour of the die 10. This casing is intended to stiffen and strengthen the die against the bursting pressures that result during the extrusion process. Furthermore, the casing will provide the necessary dimensional stability and prevent radial expansion of the die as the part to be formed is forced through the die. FIG. 5 illustrates a blank, generally a length of cylindrical metal having a central opening in position to enter the die from the end 32. The die is located on a press, and the lower surface 30 is supported on the structure of the press.

Figure 6:
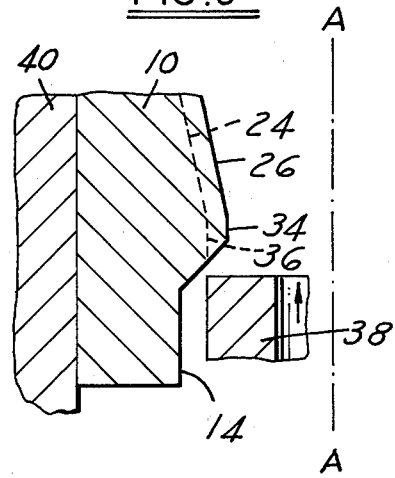
FIG. 6 is a partial cross section of the die illustrating the land formed by removing the corner from the inner die surface.

The blank 38 has an outside diameter somewhat less than the diameter of the bore 14 but larger than the portion of the land identified by numeral 36, which defines the major diameter of the gear tooth. The blank 38 is driven by the press axially through the die. The portion of the land indicated by numeral 36 would restrict the passage of the blank 38 except for the effect of the axial force that forces the blank through the die. In order to clear the land, the material of the blank is made to deform in the axial and radial directions by elastic and plastic deformation. After the blank has passed the land, the elastic strain energy induced in the blank in the process of clearing the land is released and the blank expands radially outwardly about the axis A—A as shown in FIG. 6. Beyond the land, the tapers of the surfaces 24, 26 are radially outward and can accommodate the radial expansion of the blank in the increased annular space provided beyond the land.

In the process of forming the length of the land by the lapping process, a balance is struck between conflicting interests. On the one hand, a long land surface will produce an extrusion having a more uniform contour than if the land were short, but a short land will reduce the amount of friction that results when the blank is forced through the throat defined by the land. Typically, when forming a gear having a major diameter of approximaterly 1½ inches, the land will have an axial length of approximately 0.100 inches. In this way the amount of friction is within the limits of standard metal forming presses and the extrusion has an acceptable uniformity and consistency.

Having thus described a preferred form of my invention, what I claim and desire to secure by U.S. Letters Patent is:

1. A die adapted to form an extrusion made by the method comprising the steps of:
   elastically contracting the transverse size of a die blank by an amount of contraction that varies continuously along at least a portion of the length of the die;
   forming a hole through the die blank; and
   releasing the elastic contraction of the die blank.

2. A die blank adapted to form an extrusion made by the method comprising the steps of:
   forming a die blank having a first opening and a second opening whose transverse size is larger than that of the first opening, each opening extending along a portion of the length of the die;

elastically contracting the transverse size of the first opening by an amount of contraction that varies continuously along at least a portion of the length of the die;

forming a hole through the die blank; and releasing the elastic contraction of the die blank whereby the size of the first opening is permitted to expand.

3. A method of making a die adapted to form an extrusion comprising the steps of:

elastically contracting the transverse size of a die blank by an amount of contraction that varies continuously along at least a portion of the length of the die;

forming a hole through the die blank; and releasing the elastic contraction of the die blank.

4. The method of claim 3 further comprising forming a land on the surface of the hole.

5. A method of making a die adapted to form an extrusion comprising the steps of forming a die blank having a first opening and a larger second opening, each opening extending along a portion of the length of the die blank;

elastically contracting the transverse size of the first opening by an amount that varies continuously along at least a portion of the length of the die;

forming a hole through the die blank; and releasing the elastic contraction of the die blank whereby the size of the first opening is permitted to expand.

6. The method according to claim 5 further comprising:

forming a land on the inner surface of the die blank at the innermost extremity of the first opening.

7. The method according to claim 5 wherein forming the openings in the die blank comprises:

boring a first axially directed cylindrical hole through a portion of the length of the die blank from a first axial end thereof; and boring a second axially directed cylindrical hole aligned with the first hole having a larger diameter than the first hole through a portion of the length of the die blank from a second end axially opposite the first end.

8. The method of claim 7 further comprising the step of connecting the first and second holes across the full diameter of the first hole.

9. The method according to claim 5 wherein elastically contracting the size of the first opening by elastic contraction of the die blank comprises:

fitting a sleeve having a smaller inner diameter than the outer diameter of the die blank over the outer surface of the blank to produce an elastic contraction of the die blank that varies along the length of the die.

10. The method of claim 9 wherein the sleeve having an outer surface whose diameter varies linearly over its length from its largest diameter located adjacent an axial end of the die blank to its smallest diameter located at the axial opposite end of the sleeve is fitted with diametral interference between the die blank and a case having a bore formed with a complementary surface to the outer surface of the die.

11. The method of claim 5 wherein forming a hole through the die blank comprises:

forming the outer contour of an electrode along the length of the first opening by passing the electrode through the first opening.

12. The method of claim 3 wherein forming a hole through the die blank comprises forming an axial hole through the die blank having the outer contour of an electrode and passing the electrode through the die blank.

13. The method of claim 11 or 12 wherein the electrode is made to rotate about its longitudinal axis as it passes axially through the die blank.

14. The method of claim 3 or 5 comprising the further steps of:

removing the recast layer from the inner surface of the die;

passing a tapered grinder through the inner surface of the die to establish the desired inner diameter of the die;

forming a land on the inner diameter of the hole adjacent the axial location of the least amount of elastic contraction.

* * * * *